Figure 1:
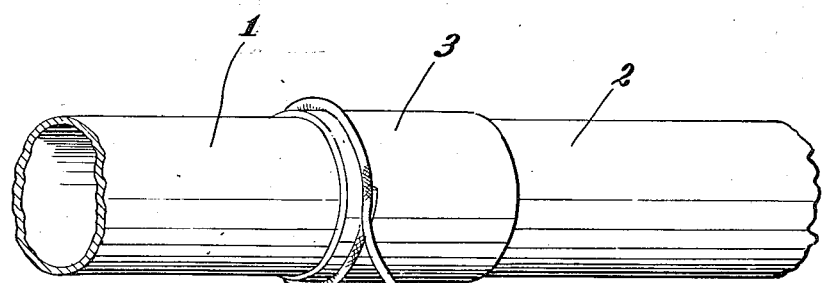

Jan. 16, 1945. C. O. DAVIS 2,367,206
METHOD OF JOINING OBJECTS
Filed March 11, 1942 2 Sheets-Sheet 1

C. O. Davis INVENTOR
BY Thos. A. Wilson
ATTORNEY

Jan. 16, 1945.    C. O. DAVIS    2,367,206
METHOD OF JOINING OBJECTS
Filed March 11, 1942    2 Sheets-Sheet 2

C. O. Davis INVENTOR.
BY Thos. A. Wilson
ATTORNEY

Patented Jan. 16, 1945

2,367,206

UNITED STATES PATENT OFFICE 2,367,206

METHOD OF JOINING OBJECTS

Clyde O. Davis, Woodbury, N. J., assignor to E. I. du Pont de Nemours & Company, Wilmington, Del., a corporation of Delaware Application March 11, 1942, Serial No. 434,231

8 Claims. (Cl. 29—148)

This invention relates to a method of joining adjacent objects and more particularly to a novel and efficient method of connecting metal cables, rods, pipes, and the like, with a minimum of effort.

Various methods have been employed when it has been desired to make a tight and certain connection between metal objects such as those described. In connecting pipes, for example, the ends are frequently threaded externally and these are then screwed into a threaded coupling. The pipes may be joined also by caulking, welding, by the use of flanged and bolted joints, and by various other means. Well known methods are available also for the connecting of rods, cables, and the like. In joining pipes, it is frequently necessary to form a junction that will withstand high liquid and vapor pressures, while in the case of cables, strength and excellent electrical contact are ordinarily required. The methods of the prior art often necessitate considerable mechanical effort and are frequently employed only with difficulty when the objects to be joined are not in readily accessible locations.

An object of the present invention is a novel and efficient method of connecting adjacent objects. A further object is such a method for connecting metal objects which is particularly advantageous when such objects are in a relatively inaccessible position for mechanical treatment. A still further object is a method of joining metal pipes which gives strong and tight joints with little labor. A further object is an effective method of establishing firm connections between adjacent metal rods and cables. Additional objects will be disclosed as the invention is described more at length hereinafter.

I have found that the foregoing objects are accomplished when I surround the terminal portion of an elongated metal object with a sleevelike opening in a second metal object, substantially girding said sleeve with an explosive charge, and effecting the junction between the metal objects by exploding the charge.

A broad application of the invention comprises simply the joining of one object to another by the method described. I may, for example, close off a pipe by inserting said pipe inside one of larger diameter, this latter having one end closed by a flange blanked off. An explosive charge of suitable type and amount is placed around the outer pipe at a point where the two overlap and is brought to explosion. This causes a tight juncture of the two pipes and a complete sealing of the inner tube at the end in question.

The preferred application of the invention, however, will be to the joining of elongated metal objects by a connecting metal element in the form of a sleeve into which project the ends of the objects to be joined. This juncture is effected by the use of an explosive charge in the manner described above.

An important field for use will be in the joining of at least two pipes of the same or different diameters by inserting adjacent ends of the two pipes within a coupling pipe of larger diameter. Explosive charges are placed about the pipe sleeve at at least two different places where the sleeve overlaps the respective pipes and tight connections are obtained by explosion of these charges. The same procedure is followed in the joining of adjacent cables and rods, namely, by placing a metal sleeve around the adjoining metal objects and blasting a tight connection by means of explosive charges.

Various types of explosives may be used in carrying out the invention. It is possible, for example, to utilize a charge of a low velocity propellent explosive such as black powder or smokeless powder. With such explosives, it will be necessary to employ considerable confinement in order to direct the explosive pressure toward the connecting element, because of the relatively low velocity of decomposition of the materials.

Desirably, however, I use high explosives as the connecting impulse, that is to say explosives that detonate at high velocity, for example at a rate above 1000 meters per second when determined according to the usual methods. I find detonating fuse to be particularly suitable for the purpose, particularly the type known as "Primacord," which comprises an explosive core of pentaerythritol tetranitrate enclosed within a waterproofed textile covering. This fuse is flexible and can be wound around the metal sleeve in one or more coils, as desired. Cordeau fuse may likewise be employed, which comprises a high density core of TNT enclosed in a lead casing. Another method of accomplishing the objective consists in employing a hollow cylinder of a detonating explosive preferably enclosed in a paper wrapper. This sleeve or sheath of explosive may be placed about the metal sleeve. With such an arrangement, explosives such as PETN, 50—50 blends of PETN and TNT, 80—20 mixtures of cyclotrimethylene trinitramine and TNT, various dynamite compositions, and many others may be used. These explosives can be brought to detonation by means of a commercial blasting cap or otherwise. It may, in some cases, be desirable to form a groove about the outer connecting sleeve and cause the explosive charge to lie generally in this groove.

Figure 2:
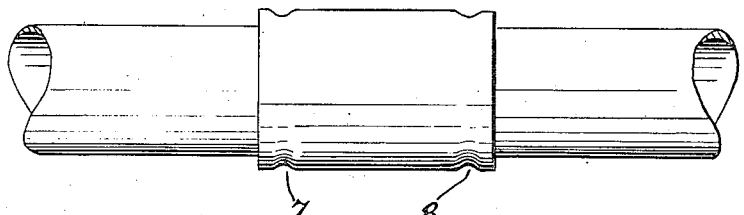
Figures 3, 4:
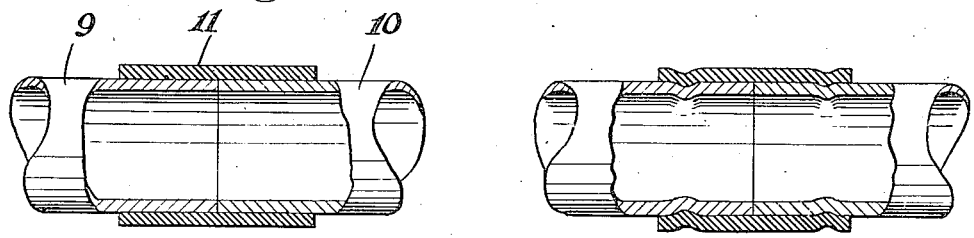
Figure 5:
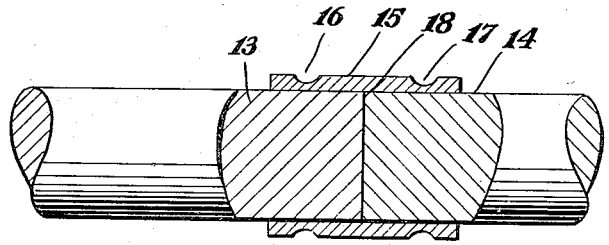
Figure 6:
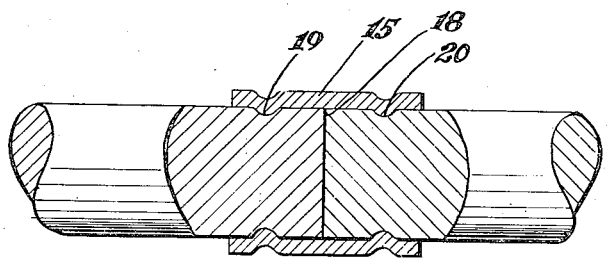

The method of carrying out the invention may be illustrated more clearly by reference to the accompanying drawings, in which Figure 1 represents two pipes with explosive in place ready for blasting, Figure 2 two pipes after joining by blasting procedure, Figure 3 a cross-section of two pipes before joining, and Figure 4 a similar cross-section after junction by means of explosives. Figures 5 and 6 are similar to Figures 3 and 4 except that they are views of the solid rod as contrasted with the pipes of Figures 3 and 4.

Referring to Figure 1, the pipes 1 and 2 are inserted into connecting pipe 3 of slightly larger diameter and are butted up rather closely together. One turn of "Primacord" 4 is caused to encircle the connecting pipe at the position indicated, rather close to one end of said connector. The blasting cap 5 is placed adjacent to the end of the "Primacord," and is adapted to be set off by the fuse 6.

Figure 2 represents the appearance of two pipes after connection by blasting in the manner shown in Figure 1, except that a coil of detonating fuse has been fired at each end of the connector coupling. The pipes 1 and 2 are again shown in the connector 3. At 7 and 8 are shown depressions in the connector as a result of the explosion of the respective coils of detonating fuse. While the compression and indentation of the metal of the pipes is not apparent in this view, it will be appreciated that the metal of the outer sleeve has been compressed into the metal of the pipes.

Figure 3 represents a cross-section of two pipes 9 and 10 in position for joining in accordance with the invention, inserted into sleeve 11 and butted against one another at 12. While the explosive charge is not sown, the connection is carried out in the manner illustrated in Figure 1.

Figure 4 shows the same pipes in cross-section after the connection by means of the explosive. The gripping effect of the connecting sleeve is very apparent from this figure. It will be understood that a stronger connection may be obtained if the pipes have cavities or grooves, prior to explosion, into which the outer sleeve metal is driven, possibly with a lining of a softer metal such as copper, lead, and the like. Likewise, it might be desirable to have projections or threads on the sleeve which correspond generally with the indentations or grooves in the pipes.

Figures 5 and 6 show the invention as applied to the joining of solid rods. Figure 5 represents a cross-section of two rods 13 and 14 in position for joining in accordance with the invention, inserted into the sleeve 15 which is already grooved on its external surfaces at 16 and 17. The rods are butted against one another at 18. While the sleeve 15 is not shown, the connection is carried out in the manner illustrated in Figure 1.

Figure 6 shows the same rods in cross-section after connection by means of the sleeve. The gripping effect of the connecting sleeve is apparent from this figure. It will be noted that a strong connection has been achieved by the force of the explosion which drove the metal of the sleeve 15 at locations 16 and 17 into the metal of the rods at 19 and 20.

The following example is a specific embodiment of a procedure in accordance with my invention.

*Example 1*

Two lengths of pipe 4½ inches in diameter were butted together within a relatively loose-fitting sleeve comprising a larger diameter pipe 4 inches in length. Six wraps of "Primacord" were then made around the sleeve near one end. The "Primacord" contained an explosive core of PETN encased in fabric and was detonated by means of a blasting cap, with the result that a uniform constriction took place in the sleeve of a depth of about ⅛ inch and a width of ½ to ¾ inch. This constriction extended completely about the sleeve and a corresponding bulge occurred inside the pipes. A similar shrinkage bond was made about the other end of the sleeve to secure the second length of pipe. The joint thus formed between the pipes was subjected to internal water pressure. The joint held satisfactorily at a pressure of 800 lbs./sq. inch.

*Example 2*

A similar experiment was carried out using a special detonating fuse consisting of lead tubing of an inside diameter of $\frac{3}{16}$ inch, filled with a blend of PETN and TNT in 50–50 proportions. A tight joint resulted.

From the foregoing description and illustrations of the invention it will be seen that the bonding and sealing effect comes from the direct action of the explosive force on the metal connecting elements without the interposition of any intervening object to change the direction of the blow. Since the explosive charge substantially encompasses said connecting element, the sealing of the two objects takes place at all points around said object, the outer metal actually being driven into the inner one to form a junction.

My invention has been described at some length in the foregoing. It will be understood, however, that various deviations from the exact procedures and assemblies outlined may be introduced without departure from the scope of the invention. For example, the application will ordinarily be to the bonding of metal objects; I may apply it, however, to objects of any materials of sufficient ductility or plasticity to permit the use of high explosives. Likewise, it may be desirable to interpose non-metallic lining or gasket materials, or linings of relatively soft metals, between the two metal surfaces in order to obtain tighter junctions. I intend to be limited, therefore, only by the following patent claims.

I claim:

1. The method of joining two objects of ductile material which comprises inserting one of said objects into an opening in the second object, placing a high explosive charge substantially completely around and substantially in form fitting contact with the outside of the outer object, exploding said charge, and thereby effecting a junction of said objects.

2. The method of joining at least two adjacent objects of ductile material which comprises surrounding projecting parts of said objects with a connecting element shaped to encompass said projecting parts at the areas of contact, placing a high explosive charge substantially completely around and substantially in form fitting contact with the outside of the connecting element at each of said contact areas, exploding said charges, and thereby effecting a junction of said objects.

3. The method of joining at least two elongated metal objects which comprises surrounding terminal portions of said objects with a metal connecting element having hollow portions at least at the ends thereof for the reception of said elongated objects, positioning a high explosive charge around and substantially in form fitting contact with the outside of the connecting element and at each of the areas where said connecting element surrounds the metal objects, exploding said charges, and effecting a junction of said metal objects.

4. The method of joining at least two elongated metal objects which comprises surrounding terminal portions of said objects with a metal connecting element having hollow portions, at least at the ends thereof, for the reception of said elongated objects, positioning a hollow cylindrical sheath of detonating explosive around the outside of the connecting element and at each of the areas where said connecting element surrounds the metal object, exploding said detonating explosive to effect a junction of said metal objects.

5. The method of joining at least two elongated metal objects which comprises surrounding terminal portions of said objects with a metal connecting element having hollow portions, at least at the ends thereof, for the reception of said elongated objects, disposing at least one coil of detonating fuse around the outside of the connecting element and at each of the areas where said connecting element surrounds the metal objects, exploding said detonating explosive to force the metal of the connecting element inwardly upon the object to be joined effecting a junction of said metal objects.

6. The method of connecting metal cables which comprises inserting the ends of adjoining cables within a metal sleeve, placing a high explosive charge around and substantially in form fitting contact with said sleeve at places where said sleeve overlaps the respective cable ends, exploding said charges, and thereby effecting firm contact between said cables said high explosive having a rate of detonation above 1000 meters per second.

7. The method of connecting metal rods which comprises inserting the ends of adjoining rods within a metal sleeve, substantially surrounding said sleeve with a high explosive and substantially in form fitting contact with said sleeve at places where said sleeve overlaps the respective rod ends, exploding said charges, and effecting firm contact between said rods said high explosive having a rate of detonation above 1000 meters per second.

8. The method of connecting metal pipes which comprises inserting the ends of adjoining pipes within a metal sleeve, substantially surrounding said sleeve with a high explosive charge so that an explosive charge is present outside and substantially in form fitting contact with the sleeve where this overlaps each of the pipe ends, exploding said charges and thus effecting juncture between the two pipes said high explosive having a rate of detonation above 1000 meters per second.

CLYDE O. DAVIS.